(12) United States Patent
Dichtl et al.

(10) Patent No.: US 7,234,692 B2
(45) Date of Patent: Jun. 26, 2007

(54) COLUMN TRAY

(75) Inventors: Gottfried Dichtl, Nieder-Olm (DE); Ulrich Walter, Idstein (DE)

(73) Assignee: QVF Engineering GmbH, Mainz (DE)

(*) Notice: Subject to any disclaimer, the term of this patent is extended or adjusted under 35 U.S.C. 154(b) by 0 days.

(21) Appl. No.: 10/777,163

(22) Filed: Feb. 13, 2004

(65) Prior Publication Data

US 2004/0183217 A1    Sep. 23, 2004

Related U.S. Application Data

(63) Continuation-in-part of application No. PCT/EP02/09253, filed on Aug. 19, 2002.

(30) Foreign Application Priority Data

Aug. 17, 2001  (DE) .................. 101 40 352

(51) Int. Cl.
   *B01F 3/04* (2006.01)
(52) U.S. Cl. ................ 261/114.2; 261/114.5
(58) Field of Classification Search ........... 261/114.1, 261/114.2, 114.5
   See application file for complete search history.

(56) References Cited

U.S. PATENT DOCUMENTS

| | | | | |
|---|---|---|---|---|
| 1,738,386 A | * | 12/1929 | Morrell | 261/114.1 |
| 2,091,349 A | * | 8/1937 | Bergman | 261/114.2 |
| 2,191,919 A | * | 2/1940 | Thayer | 422/256 |
| 2,241,114 A | * | 5/1941 | Brunjes | 261/114.1 |
| 2,428,889 A | * | 10/1947 | Nutter | 261/114.2 |
| 2,522,425 A | * | 9/1950 | Baumann et al. | 261/114.2 |
| 2,632,638 A | * | 3/1953 | Turner | 261/114.5 |
| 3,259,380 A | | 7/1966 | Brown | |
| 3,573,172 A | * | 3/1971 | Streuber | 202/158 |
| 3,674,246 A | * | 7/1972 | Freeman | 261/114.1 |
| 4,028,442 A | | 6/1977 | Eckert | |
| 4,038,366 A | * | 7/1977 | Fukuda et al. | 423/234 |
| 4,254,291 A | * | 3/1981 | Kane | 568/875 |
| 4,427,605 A | | 1/1984 | Meier et al. | |

(Continued)

FOREIGN PATENT DOCUMENTS

DE    1 262 225    12/1961

(Continued)

OTHER PUBLICATIONS

European Patent Office Action dated Feb. 06, 2004 in European Application No. 02 758 473.9.

*Primary Examiner*—Scott Bushey
(74) *Attorney, Agent, or Firm*—Womble Carlyle

(57) ABSTRACT

A column tray assembly includes a tray having passages formed therein. The tray is a multifunction tray and is configured to receiving appropriate superstructures which can be selected according to the respective use of the assembly. Superstructures which communicate with the passages are mounted to the tray. The superstructures have gas penetration holes embedded in such way that, when the superstructures are mounted to the tray, the orifices of the gas penetration holes extend in a perpendicular manner in relation to the tray. The tray and the superstructures are formed from the same or different corrosion-resistant materials or combination of materials. The tray may also be provided with smaller holes for the discharge of liquid, into which holes distributor cups, or the like are inserted. These smaller holes may be closed for specific purposes.

35 Claims, 7 Drawing Sheets

U.S. PATENT DOCUMENTS

| | | | |
|---|---|---|---|
| 4,788,040 A | * 11/1988 | Campagnolo et al. | 422/220 |
| 4,820,455 A | 4/1989 | Kunesh et al. | |
| 4,839,209 A | * 6/1989 | Simon et al. | 428/68 |
| 4,933,047 A | * 6/1990 | Bannon | 202/197 |
| 5,281,369 A | 1/1994 | Pluss | |
| 5,498,754 A | * 3/1996 | Nakamura et al. | 562/113 |
| 5,514,305 A | 5/1996 | Ebeling | |

FOREIGN PATENT DOCUMENTS

| | | |
|---|---|---|
| DE | 29 43 687 | 10/1979 |
| DE | 3604013 | 2/1986 |

* cited by examiner

COLUMN TRAY

RELATED APPLICATIONS

This is a Continuation-in-Part of International Application No. PCT/EP02/09253 filed Aug. 19, 2002, which designated the United States, published as WO 03/015889, and whose contents are incorporated by reference.

FIELD OF THE INVENTION

The present invention relates to column trays and columns including such column trays.

BACKGROUND OF THE INVENTION

In the case of known columns comprising structured packings and/or random packings, these are held in the column by at least one support tray. The liquid is distributed as uniformly as possible over the bed of structured packings or bed of random packings at the feed point or the reflux point by means of a liquid distributor tray. The structured packings or the random packings rest on the support tray. The column has, as a rule, a plurality of beds of structured packings or random packings. Between two successive beds of structured packings or random packings, the liquid must be distributed as uniformly as possible over the bed underneath. Liquid collectors are used for collecting liquid, for example on a bed underneath, or for removing liquid, for example from the column. Thus, in known columns comprising structured packings and/or random packings, support trays, liquid distributors, liquid redistributors and/or liquid collectors are used as individual trays.

For corrosion-resistant plant construction, in particular for the diameter range from 600 mm to over 2000 mm, enamel columns are used.

For design reasons, the internals for the columns (liquid distributor, liquid redistributor, liquid collector and mass transfer tray) are manufactured from materials other than steel/enamel. The support trays constitute an exception. Support trays which are in the form of slotted trays and whose slotted plate is enamelled on both sides are known. These known steel/enamel support trays have a free cross-section of only about 40%, based on the total column cross-section. This small free cross-section has the considerable disadvantage that no high gas loads (F factors greater than 1.8) and liquid loads (greater than 40 $m^3/m^2h$) can be run in the column, although this would be possible with modern structured packings and random packings.

It is known that constructions of tantalum or ceramic can be used to enable high gas loads (F factors greater than 1.8) to be run in the column. However, ceramic has less corrosion resistance than glass and enamel. Tantalum constructions are considerably more expensive than steel/enamel constructions.

In order to provide large flow cross-sections from the gas flow in the case of columns having a high gas throughput, U.S. Pat. No. 4,028,442 discloses that a column tray which is not flat should be provided for a column having a high gas throughput. In order to increase the flow cross-section for the gas throughput, the column tray has a grid which is undulating or formed with inclined or perpendicular sections and is supported on a support structure in the column. Owing to the inclined or perpendicular shape of the grid with the orifices formed therein for the gas flow, the flow cross-section is greater than in the case of a flat embodiment of the grid.

U.S. Pat. No. 5,281,369 discloses column trays having a grid which is undulating or is arranged on a support structure. The grid is formed in such a way that the gas stream passes through the region of the wave summits while the liquid is collected in the valleys and emerges downwards through small holes. Since the gas stream and the liquid stream are passed along substantially separate routes through the column tray, a higher gas flow rate can be achieved with the same liquid throughput.

These known column trays have the disadvantage that they cannot be produced without considerable costs for corrosion-resistant materials. In addition, a support structure for the grids is required in the case of the known column trays.

German Offenlegungsschrift 1 262 225 discloses a mass transfer tray in which the bubble-caps can be inserted into the tray by simply pressing in.

German Offenlegungsschrift DE 36 04 013 A1 describes a large-size corrosion-resistant mass transfer tray which consists of a glass fibre-reinforced core which is surrounded by a thin corrosion-resistant covering of PVDF. Holes for bubble-caps are provided in the tray.

German Offenlegungsschrift DE 29 43 687 A1 discloses a column tray according to the precharacterizing clause of claim 7.

The liquid distributor shown in one or more of the foregoing references has an area which is smaller than the cross-section of the column so that the gas can pass through upwards adjacent to the tray, and the free cross-section is therefore relatively large. A collector must therefore be provided above the liquid distributor in order to apply the liquid to the liquid distributor. Moreover, a support for the tray must be provided.

SUMMARY OF THE INVENTION

In one aspect, the present invention is directed to a tray that can be reconfigured as part of a reconfigurable column tray assembly. A column tray assembly which can be used as a support tray for random packings and/or packings and/or structured packings, having a tray and gas penetration holes which are formed in such a way that their orifices are transverse (i.e., perpendicular or inclined) to the column tray, is characterized in that the column tray assembly includes a tray having passages for receiving the superstructures, and the gas penetration holes are arranged in the superstructures.

This column tray assembly according to the invention is simpler and cheaper to produce because the formation of a flat tray which can therefore be enamelled is possible by increasing the free cross-section for the gas penetration in the superstructures.

Since the gas penetration holes are formed in the superstructures, it is possible to make the tray of the column tray assembly flat. This has the advantage that the tray can be coated with highly corrosion-resistant materials, such as, for example, enamel and the plastics mentioned in the further claims. Furthermore, the column tray assembly according to the invention can be clamped in a simple manner between two column sections. It is therefore possible—but not necessary—to form the column tray without the known support construction.

According to the invention, it may be possible also to form further gas penetration holes in the tray itself. According to the invention, however, gas penetration holes must also be formed in the superstructures in order to create a sufficiently large gas penetration cross-section.

The invention has the further advantage that the tray of the column tray assembly can be formed from steel with a corrosion-resistant coating and the superstructures of more complicated design can be formed from a corrosion-resistant plastic and/or from glass.

According to the invention, the superstructures can be formed in such a way that they form a support for a structured packing on which the packing rests. The superstructures can furthermore form a support for at least one grid on which the structured packing and/or the random packings rest.

According to an embodiment of the invention, the superstructures are embedded between the random packings and/or structured packings of the column. This has the advantage that there is no loss or only a very small loss of the active column height. The column tray assembly according to the invention which is used as a support tray preferably has small holes for the liquid throughput, the random packings and structured packings preferably being present in the intermediate spaces between the superstructures of the column, and the superstructures thus extending into the random packing or structured packing layer.

According to an embodiment of the invention, the column tray assembly can additionally be used as a liquid distributor, liquid redistributor and/or liquid collector. As a result of the dual function of the column tray assembly, the column has fewer components and is more economical. According to the invention, in some embodiments, the separate components of support grid, collector and liquid redistributor otherwise customary in column construction can be combined into one component.

According to an embodiment of the invention, the area of the tray is greater than the cross-sectional area of the column. This has the advantage that the tray can be clamped between two column sections. According to the invention, the area of the tray will also be equal to the cross-sectional area of the column. In this case, the tray can be suspended from the tray above or can rest on the tray underneath.

In another aspect of the present invention, a column tray assembly which can be used as a liquid distributor, liquid redistributor and/or liquid collector, having a tray, superstructures and gas penetration holes which are provided in the superstructures and are formed in such a way that their orifices are transverse (i.e., perpendicular or inclined) to the column tray assembly, is characterized in that the tray has passages for receiving the superstructures, and the area of the tray is greater than or equal to the cross-sectional area of the column.

The embodiment of the invention has the advantage that gas penetration orifices can be provided in the superstructures in order to achieve a high free cross-section for the gas penetration. It is therefore possible to form the tray up to the edge of the column, with a sufficient free cross-section for the gas penetration. Since the column tray assembly is thus directly adjacent to the wall of the column and can be fastened or flange-connected there, the column tray assembly according to the invention has a dual function, i.e. the support for the column tray assembly can be omitted. Furthermore, the collector arranged over the liquid distributor can be omitted because the liquid distributor extends over the total cross-section of the column.

According to an embodiment of the invention, the column tray assembly can additionally be used as a support tray for random packings and/or structured packings, and the superstructures are formed in such a way that they form a support for at least one structured packing and/or for at least one grid, on which grid or grids random packings rest. In this embodiment, a further part is omitted owing to the dual function of the column tray assembly, with the result that, on the one hand, the active column height increases and, on the other hand, the costs can be reduced.

According to a preferred embodiment of the invention, the tray of the column tray assembly is made flat. This has the advantage that the tray can be more simply produced and can be more easily provided with a corrosion-resistant coating.

According to an embodiment of the invention, the tray and the superstructures are produced from the same or different corrosion-resistant materials or material combinations.

In an embodiment of the invention, the superstructures have slots in their top.

According to an embodiment of the invention, further holes which preferably have a smaller cross-section than the passages for receiving the superstructures are provided in the tray in addition to the passages for receiving the superstructures. For example, distributor cups can be arranged in these further holes for converting the column tray assembly into a liquid distributor or liquid redistributor. In some applications, it may be advantageous if small distributor tubes are fastened in the bores of the distributor cups by screwing together, by a plug connection or in another manner, in such a way that targeted liquid distribution over structured packings or random packings of the column can be ensured.

According to the invention, the superstructures may have side walls which are substantially perpendicular to the tray, and the gas penetration holes can be formed in the side walls of the superstructures.

According to the invention, the gas penetration holes can be in particular in the form of longitudinal slots. The longitudinal slots can preferably run in each case from a point above the liquid level, which is to form during operation on the column tray assembly used as a liquid distributor, liquid redistributor and/or liquid collector, preferably up to the upper end region of the superstructure. This embodiment of the invention is possible if the column tray assembly is to be used as a liquid distributor or liquid collector. If the column tray assembly according to the invention is to be used as a support tray, the longitudinal slots preferably extend over substantially the total height of the superstructures.

According to the invention, the side walls may have a round, a circular, a polygonal, a rectangular or a square superstructure cross-section which preferably corresponds to the cross-section of the holes of the tray in which the superstructures are arranged.

In an embodiment of the invention, the superstructures may have hoods to prevent the entry of the liquid into the superstructures and hence a disturbance of the gas flow in the opposite direction. Depending on the application, the hood may have slots in order to provide additional gas penetration holes.

In order to provide a highly corrosion-resistant column tray assembly, the tray may be formed, according to the invention, from steel with an enamel coating, steel with a coating of a corrosion-resistant plastic, from corrosion-resistant special alloys or tantalum or from a corrosion-resistant plastic. Moreover, the superstructures can and should likewise be corrosion-resistant, for example of corrosion-resistant plastic, of glass, of corrosion-resistant special alloys or tantalum. The plastic may comprise polytetrafluoroethylene (PTFE), perfluoroalkoxy polymers (PFA), polyvinylidene fluoride (PVDF), polyethylene (PE), a plastic similar thereto or a combination of these plastics.

According to the invention, the superstructure in at least one passage can be arranged lower so that this superstructure can be used as an outflow pipe to the next lowest tray.

It is a further object of the invention to provide a universal tray for the column tray assemblies according to the invention, which tray is simple to produce.

This object is achieved by the features of claim 26. Advantageous embodiments of the invention are described in the dependent claims.

The tray according to the invention for a column tray assembly has passages for receiving suitable superstructures adapted to the respective purpose of the tray. The tray can be used as a universal tray so that, by holding suitable superstructures adapted to the respective purpose of the tray, the tray can be formed as a support tray, as a liquid distributor, as a liquid redistributor, as a liquid collector and/or as a mass transfer tray. Preferably, the tray has passages of relatively large diameter and further holes of relatively small diameter, which in particular in each case are distributed uniformly.

The tray according to the invention has the advantage that the operator of the column need stock only one universal basic tray as a spare part for all types of column tray assemblies. In addition, the universal tray can be manufactured in relatively large quantities, thus enabling the manufacturing costs to be reduced.

The universal tray according to the invention can be formed as a liquid distributor or liquid redistributor by installing chimneys in the passages of relatively large diameter and installing distributor cups or overflow bushes in the holes of relatively small diameter.

Furthermore, the universal tray according to the invention can be formed as a liquid connector by installing chimneys in the passages of relatively large diameter, by omitting or closing the holes of relatively small diameter and by providing at least one outflow pipe.

Furthermore, the universal tray according to the invention can be formed as a support tray by installing, in the passages of relatively large diameter, chimneys provided with longitudinal slots over substantially the entire height.

Furthermore, the universal tray according to the invention can be formed as a support tray and liquid redistributor by installing distributor cups or overflow bushes in the further holes of relatively small diameter.

Furthermore, the universal tray according to the invention can be formed as a mass transfer tray by installing at least one outflow pipe in at least one passage of relatively large diameter, by omitting, closing or adapting the other passages of relatively large diameter with corresponding inserts, by installing bubble-caps in the holes of relatively small diameter and by providing at least one outflow pipe.

The invention also comprises the superstructures for retrofitting and/or converting existing trays with production of trays according to the invention or column tray assemblies according to the invention.

The invention also comprises a column having at least one column tray assembly according to the invention and/or at least one tray according to the invention and/or at least one superstructure according to the invention.

The column according to the invention may be an enamel-lined column, a column lined with corrosion-resistant plastics, a column lined with polytetrafluoroethylene (PTFE), perfluoroalkoxy polymers (PFA), polyvinylidene fluoride (PVDF), polyethylene (PE) or similar plastic materials, a glass column or a column made of highly corrosion-resistant metals, such as tantalum and special alloys.

BRIEF DESCRIPTION OF THE DRAWINGS

The invention is described in more detail with reference to the embodiments of the invention which are shown in the figures.

DETAILED DESCRIPTION

Figures 1, 1A:
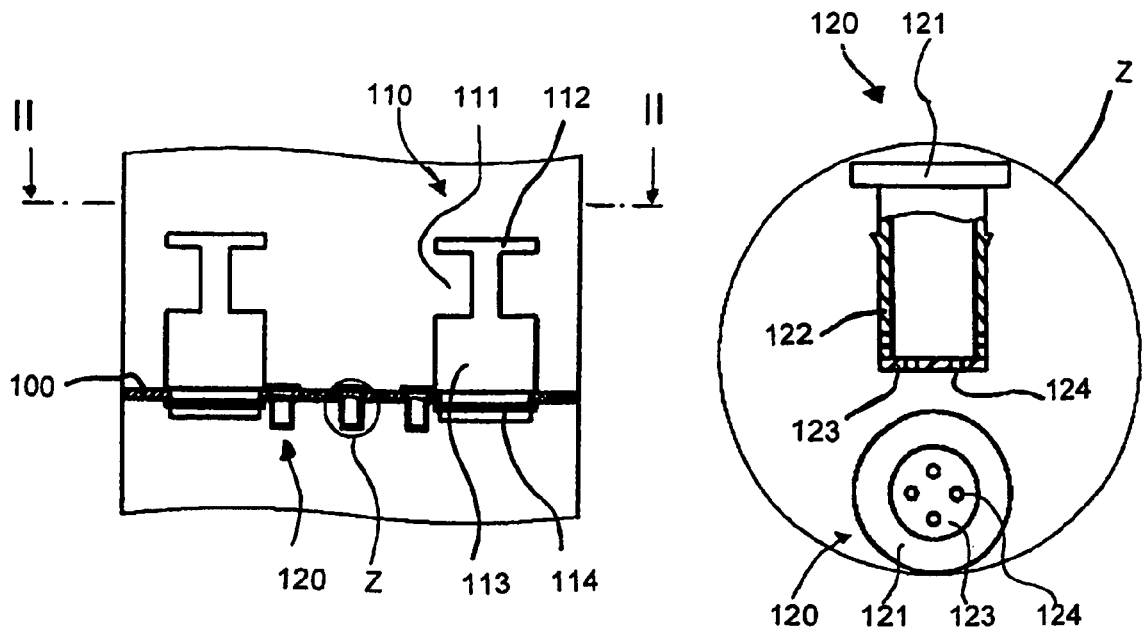
FIG. 1 shows a partial cross-section of a column having a column tray assembly according to the invention, along the line I-I of FIG. 2.
FIG. 1A shows details of the inserts (distributor cups) for the relatively small holes from the region Z of FIG. 1 on a larger scale.
Figure 2:
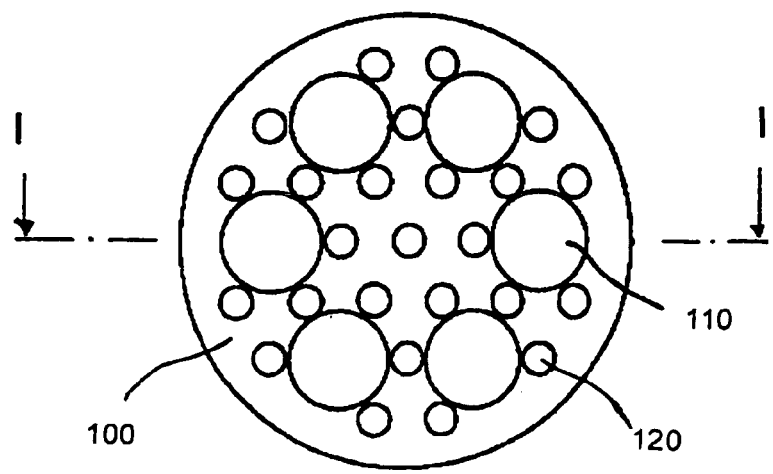
FIG. 2 shows a cross-sectional plan view of the column of FIG. 1 along the line II-II of FIG. 1.

FIGS. 1 and 2 show column tray assembly according to the invention, which can be used as a liquid distributor and liquid redistributor. FIG. 1 shows a partial cross-section of a column having a liquid distributor or liquid redistributor according to the invention, along the line I-I of FIG. 2. The column tray assembly has a tray 100. This is as a rule mounted in the column by clamping with the aid of flanges (not shown). If the tray 100 includes a metal coated with enamel or plastic, the coating need not necessarily extend up to the clamped borders or up to border edges. Relatively large holes for receiving the superstructures 110 and relatively small holes for receiving distributor cups 120 are formed in the tray. The superstructures 110 substantially comprise a cylinder which is closed at the top with a hood 112 and open at the bottom and in which longitudinal slots are formed above a certain level. In the embodiment shown, two longitudinal slots 111 are formed in the superstructure so that the remaining cylinder pipe 113 and the hood 112 are connected to one another only via two webs.

The superstructure 110 is removably mounted in the tray 100 by means of a screw connection or a plug connection. The superstructure 110 may also be fastened to the tray in another manner.

For the sake of clarity, the superstructures 110 and distributor cups 120 which do not lie on the line I-I of FIG. 1 have been omitted in FIG. 1.

FIG. 1A shows a distributor cup from the region Z of FIG. 1 on a larger scale. A cross-section of the distributor cup 120 is shown at the top of the circle. The distributor cup 120 has an upper border 121, a cylindrical side wall 122, a bottom 123, and outlet orifices 124 in the tray and optionally at the circumference. A view of the distributor cup 120 from below is shown in the lower part of FIG. 1A.

FIG. 2 shows a cross-sectional plan view of the column of FIG. 1 along the line II-II of FIG. 1. The distribution of the superstructures 110 and of the distributor cups 120 are better recognizable in this view. It can be seen that the distributor cups 120 are distributed virtually uniformly in order to provide as homogeneous a distribution as possible of the liquid over the cross-section.

In the embodiment according to FIGS. 1 and 2, liquid and gas are passed separately on the column tray assembly. The upward-flowing gas is diverted slightly and passed upwards through the superstructure (vapour/gas chimney). Consequently, the pressure drop on the gas side in the region of the distributor is reduced to a minimum.

The superstructure 110 is designed in such a way that vapours/gases emerge laterally above the liquid level. The superstructures 110 are covered with a hood 112 in order to prevent entry of the liquid arriving from the structured packing above. The superstructure 110 (chimney) used in the tray 100 has, in its lower region 113, a closed cylindrical shape in order to permit backup of the liquid on the tray 100. The distribution of the liquid over the column cross-section is ensured by means of the distributor cups 120. The distributor cups 120 are inserted into the relatively small holes of the tray 110 and are provided with holes 124 in the outflow part. The number of holes and the hole diameter are dimensioned by a person skilled in the art so that a liquid backup on the tray 100 is ensured in order to obtain a uniform distribution over the column cross-section. In the case of a low liquid load of, for example, B<2 $m^3/m^2$ h, the holes in the distributor cups 120 can be equipped with additional small distributor tubes in order to obtain a better distribution over the structured packing or random packing.

It is also possible to provide overflow bushes having lateral slots or holes above the tray instead of the distributor cups.

In the following embodiments, reference numerals of the components corresponding to the components of the first embodiment (FIGS. 1 and 2) are each incremented by 100.

In certain modes of operation of the column, it is necessary to withdraw a liquid side take-off of the column. A liquid collector is used for this purpose.

Figure 3:
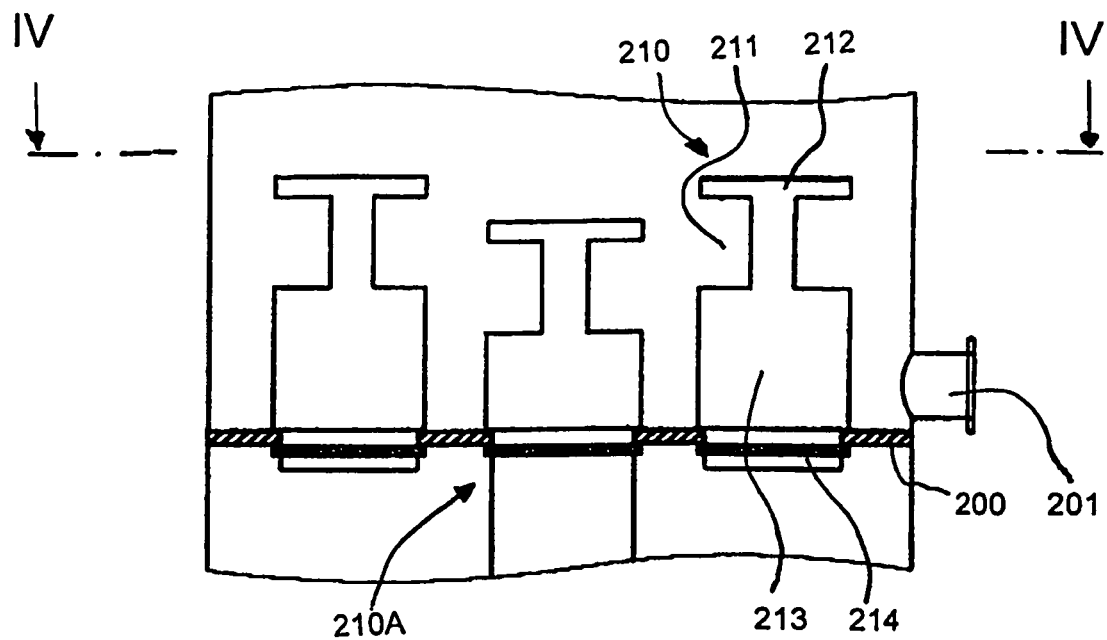
FIG. 3 shows a partial cross-section of a column having a column tray assembly according to the invention, along the line III-III of FIG. 4.
Figure 4:
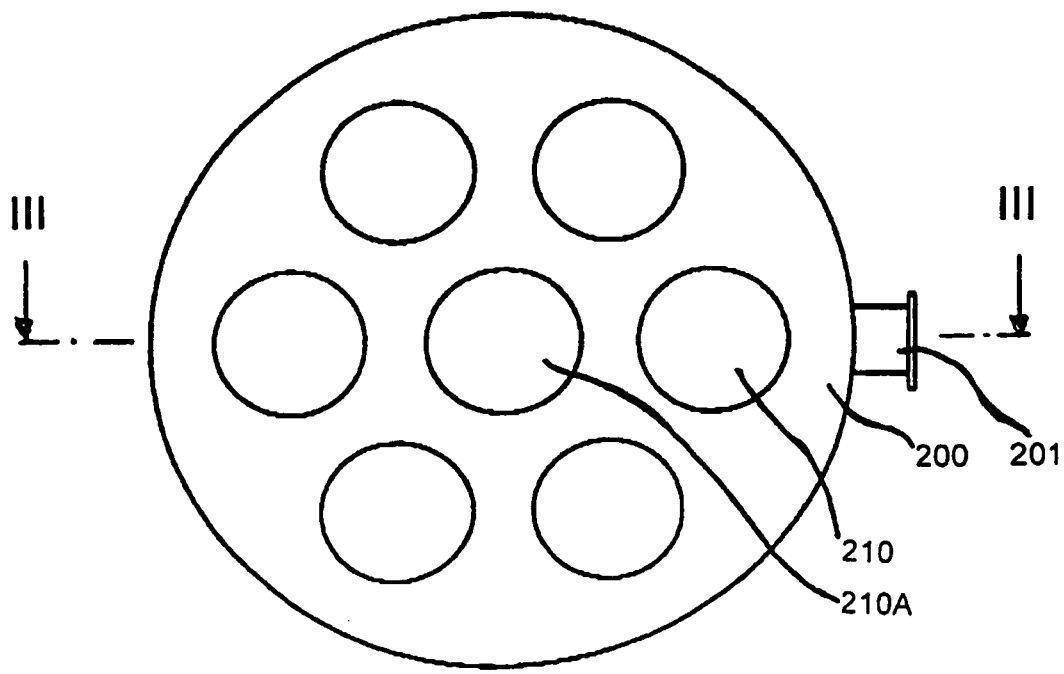
FIG. 4 shows a cross-sectional plan view of the column of FIG. 3 along the line IV-IV of FIG. 3.

FIGS. 3 and 4 show a column tray assembly according to the invention which can be used as a liquid collector. FIG. 3 shows a partial cross-section of a column having a liquid collector according to the invention, along the line III-III of FIG. 4, while FIG. 4 shows a cross-sectional plan view of the column of FIG. 3 along the line IV-IV of FIG. 3.

The tray 200 of the column tray assembly has holes that only have a large diameter, in which the superstructures 210 are held. Holes having a smaller diameter are not provided.

The superstructures 210 correspond to the superstructures 110 of the embodiment of FIGS. 1 and 2. The height of the closed cylinder wall 213 depends on the height of the connecting piece 201 for the liquid outflow from the column. It is such that total removal of the liquid from the tray can be carried out.

The closed cylindrical height of one or more (depending on the column diameter) superstructures 210A which are equipped with an outflow pipe is slightly less than the height of the other superstructures, in order, in the case of partial withdrawal of the liquid from the column, to convey the remainder via the outflow pipe onto the next tray.

Figure 5:
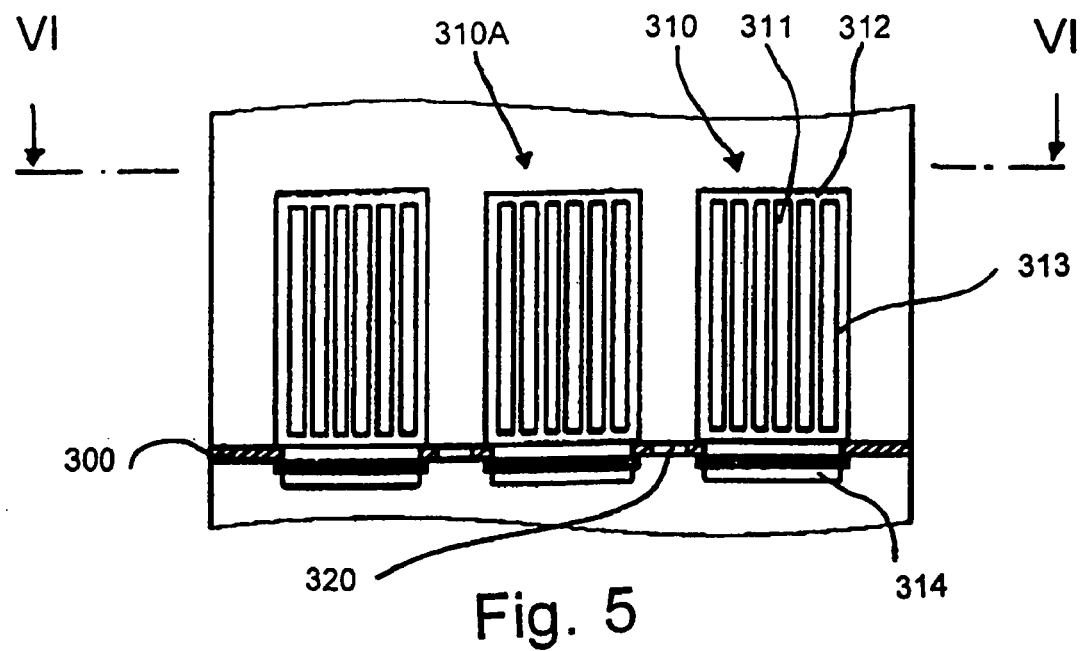
FIG. 5 shows a partial cross-section of a column having a column tray assembly according to the invention, along the line V-V of FIG. 6.
Figure 6:
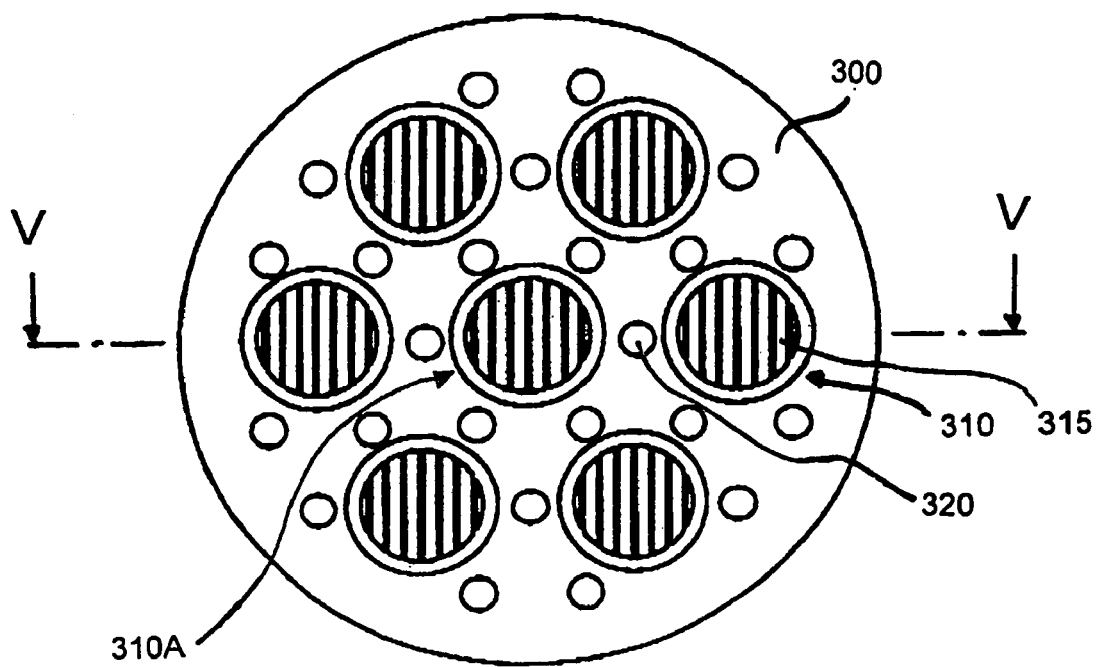
FIG. 6 shows a cross-sectional plan view of the column of FIG. 5 along the line VI-VI of FIG. 5.

FIGS. 5 and 6 show a column tray assembly according to the invention which can be used as a support tray. FIG. 5 shows a partial cross-section of a column having a column tray assembly according to the invention, along the line V-V of FIG. 6. FIG. 6 shows a cross-sectional plan view of the column of FIG. 5 along the line VI-VI of FIG. 5.

The support tray according to FIGS. 5 and 6 substantially corresponds to the embodiment according to FIGS. 1 and 2. The superstructures 310 substantially correspond to the superstructures 110. The liquid is discharged through the holes 320 of relatively small diameter. By using different hole diameters, it is in principle possible to pass gas and liquid predominately past one another. By providing distributor cups or overflow bushes in the small holes, the column tray assembly can also be used as a collector and redistributor. In the embodiment shown, the superstructures 310 are slotted over virtually the total cylindrical height in order to obtain a large free cross-section relative to the free column cross-section. A cross-section of more than 100% can be obtained, usually in the range from 80 to 130%, preferably of 110%.

The hood 312 of the superstructures 310 is slotted or perforated for increasing the free cross-section in the direction of flow. In certain embodiments, however, the hood may also be completely absent. Thus, a free cross-section of from 70 to 97%, preferably from 75 to 95%, in the direction of flow can be obtained. By the design, according to the invention, of the column tray assembly and the separation of gas and liquid on the tray, the pressure drop on the gas side is reduced to a minimum.

Figure 7:
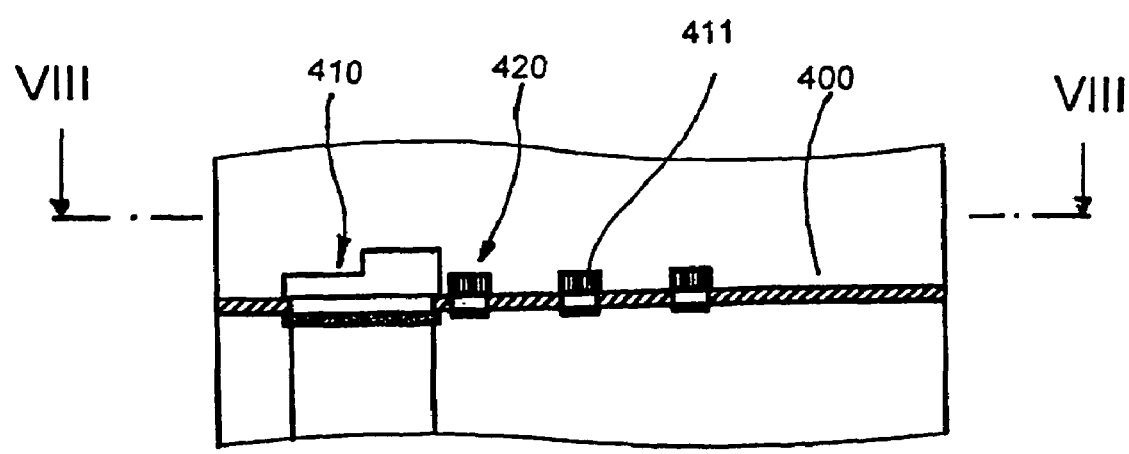
FIG. 7 shows a partial cross-section of a column having a column tray assembly according to the invention, along the line VII-VII of FIG. 8.
Figure 8:
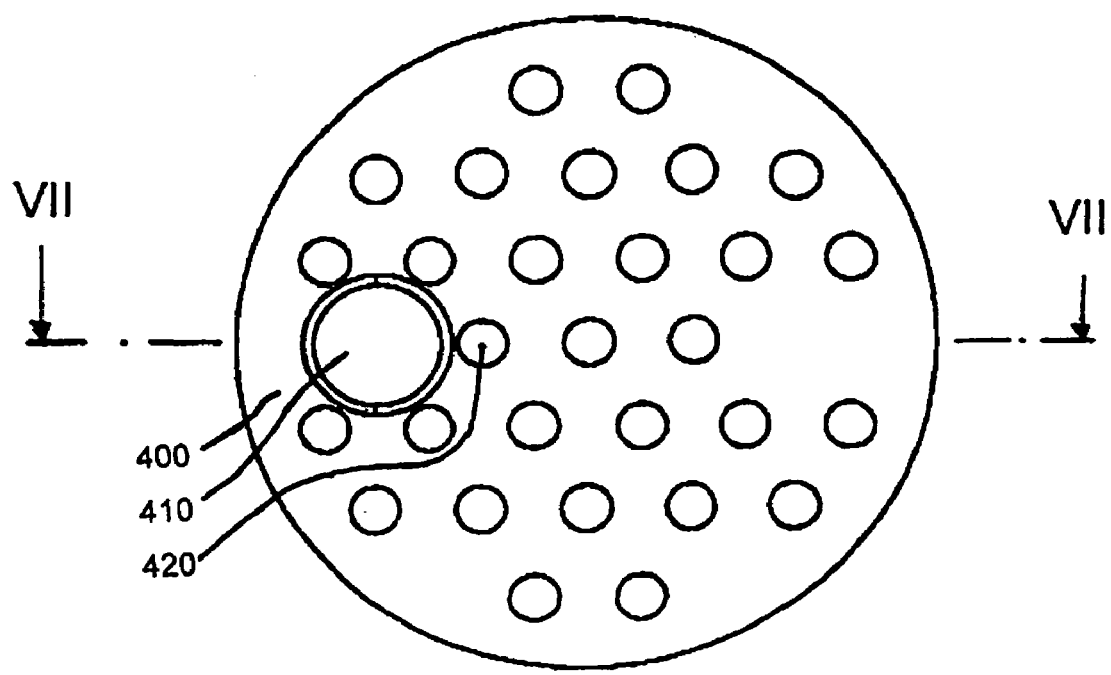
FIG. 8 shows a cross-sectional plan view of the column of FIG. 7 along the line VIII-VIII of FIG. 7.

FIGS. 7 and 8 show a column tray assembly according to the invention which can be used as a mass transfer tray. The column tray assembly shown in FIGS. 7 and 8 can also have the superstructure of a flooded bubble-cap tray known per se, but, in a tray according to the invention, the tray and/or the superstructures are produced from the corrosion-resistant materials mentioned. FIG. 7 shows a partial cross-section of a column having a mass transfer tray along the line VII-VII of FIG. 8. The liquid outflow 410 is at a higher level than the upper end of the bubble-cap-like superstructures 420 with slot-like gas penetration orifices 411 in their side walls. FIG. 8 shows a cross-sectional plan view of the column of FIG. 7 along the line VIII-VIII of FIG. 7.

Bubble-caps 420 which are formed, for example, from plastic, such as PTFE, PFA, PVDF or PE, and/or from glass are inserted into the holes of the tray having a relatively small diameter. The bubble-caps 420 are slotted on sides and permit gas penetration into the liquid layer. The liquid is passed transversely over the tray 400 and fed via outflow pipes 410 to the next lowest tray. The outflow pipes 410 are formed, for example, from plastic or glass and are inserted into holes of relatively large diameter.

Figure 9:
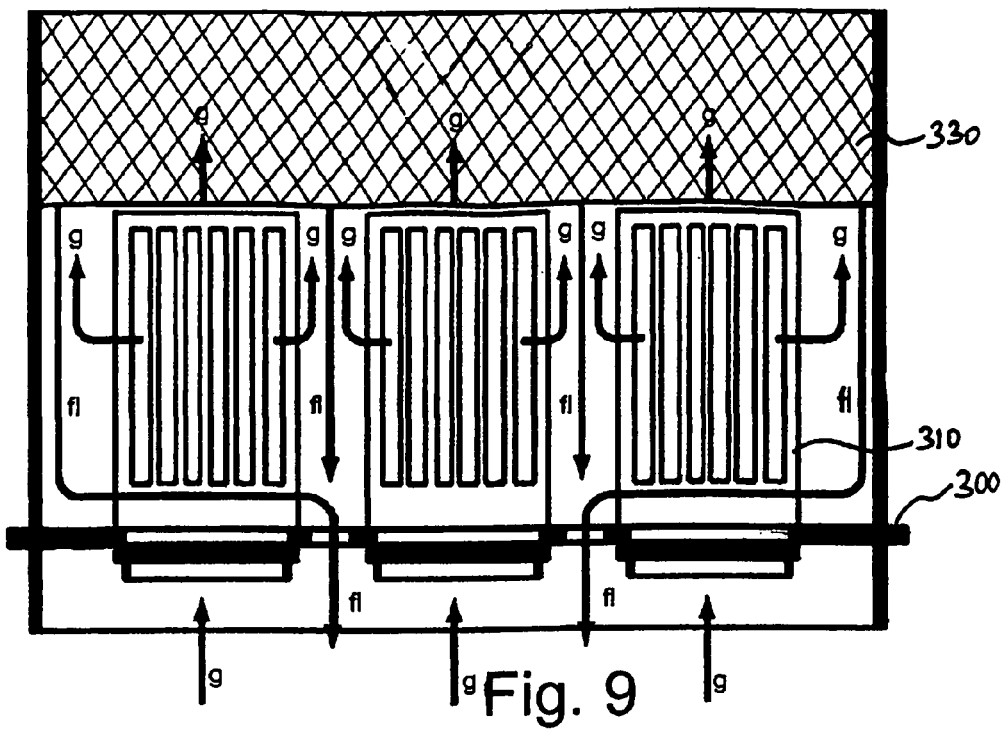
FIG. 9 shows a cross-sectional partial view through a column according to the invention, having a support tray according to the invention for a structured packing.

FIG. 9 shows a cross-sectional partial view through a column according to the invention, comprising a support tray according to the invention for a structured packing. The support tray substantially corresponds to the support tray shown in FIGS. 5 and 6. FIG. 9 also shows the structured packing 330 which rests on the top of the superstructures 310. The arrows g indicate the gas flow path and the arrows fl indicate the liquid flow path through the support tray. It is evident that the flow paths for the liquid and the gas are separated from one another. The free cross-section for the gas penetration in the case of the superstructures 310 is 120%.

Figure 10:
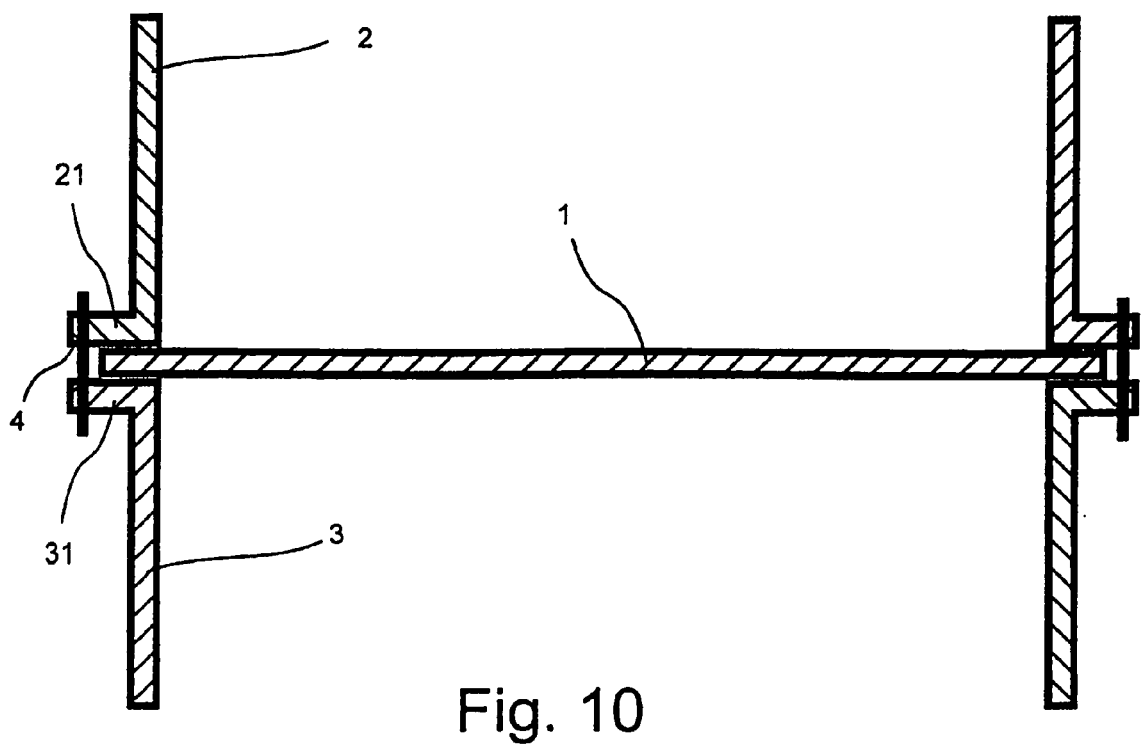
FIG. 10 shows a cross-sectional partial view through a column according to the invention, having a tray according to the invention.

FIG. 10 shows a cross-sectional partial view through a column according to the invention, comprising a tray 1 according to invention, from which figure the preferred installation of the tray 1 according to the invention in the column is evident. For the sake of clarity, no orifices are shown in the case of the tray 1. The tray 1 has an area which is slightly greater than the internal cross-sectional area of the column.

The tray 1 is clamped with its border between two outer wall sections 2, 3 of the column which follow one another perpendicularly. A flange 21 is provided on the upper outer wall section 2 and a flange 31 is provided on the lower outer wall section 3. The two flanges 21, 31 are clamped together in a manner know to a person skilled in the art, using, for example, a bolt 4. If the tray 1 is enamelled, for example, up to a region which is clamped between the flanges 21, 31, and the outer wall sections 2, 3 are enamelled on the inside, the column can be made sufficiently corrosion-resistant.

Figure 11:
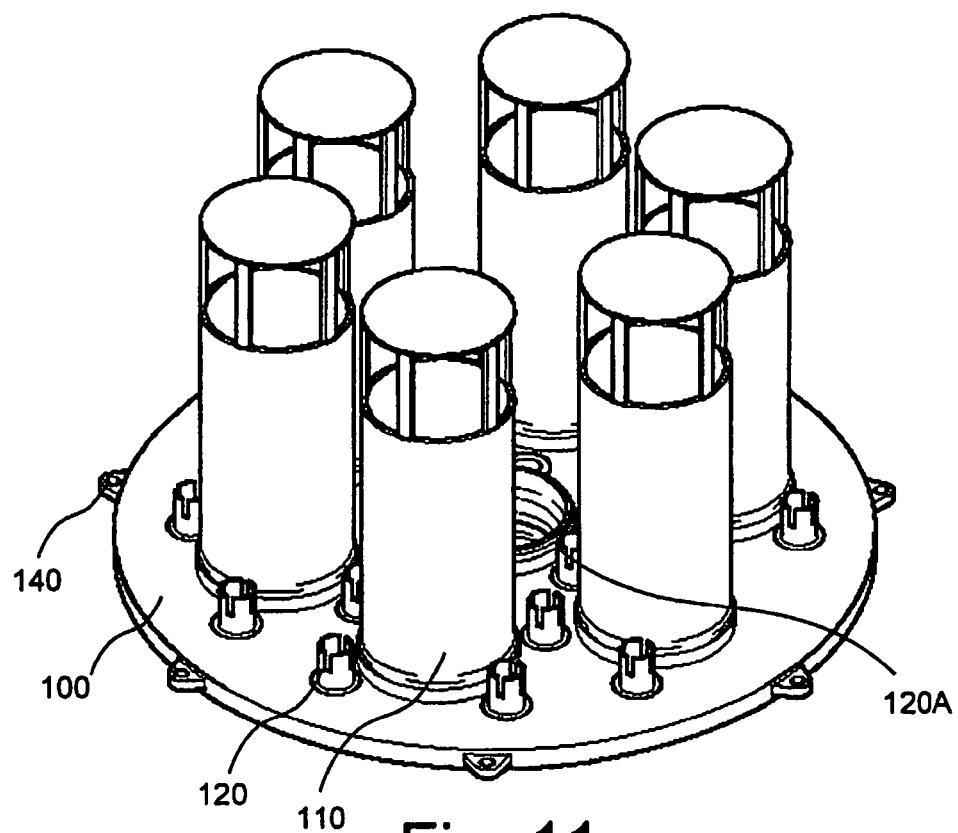
FIG. 11 shows a perspective view of a column tray assembly according to the invention, which can be used as a liquid distributor and/or as a liquid redistributor.

FIG. 11 shows a perspective view of a column tray assembly according to the invention which can be used as a liquid distributor and/or as a liquid redistributor. The column tray assembly substantially corresponds to the column tray assembly shown in FIGS. 1 and 2, and identical reference numerals denote the corresponding components. In contrast to the column tray assembly shown in FIGS. 1 and 2, the column tray assembly of FIG. 11 has, in the centre, a larger distributor cup 120A having a plurality of holes in the bottom region, the diameter of which corresponds to the diameter of the passages for the superstructures 110. This has the advantage that the tray 100 is formed in exactly the same way as the tray of the embodiments according to FIGS. 12 and 13 or 3 to 6. Furthermore, lugs 140 for the transportation and the installation of the column tray assembly in the column are provided at the border of the tray 100.

Figure 12:
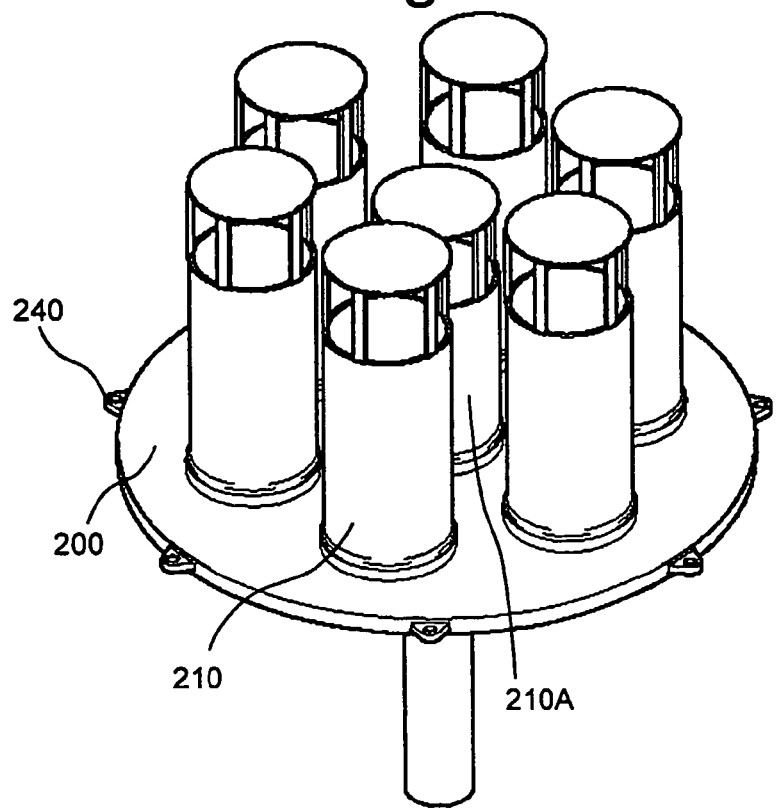
FIG. 12 shows a perspective view of a column tray assembly according to the invention, which can be used as a liquid collector.

FIG. 12 shows a perspective view of a column tray assembly according to the invention which can be used as a liquid collector. The column tray assembly substantially corresponds to the column tray assembly shown in FIGS. 3 and 4, and identical reference numerals denote the corresponding components. Lugs 240 for the transportation and the installation of the column tray assembly in the column are provided at the border of the tray 200.

Figure 13:
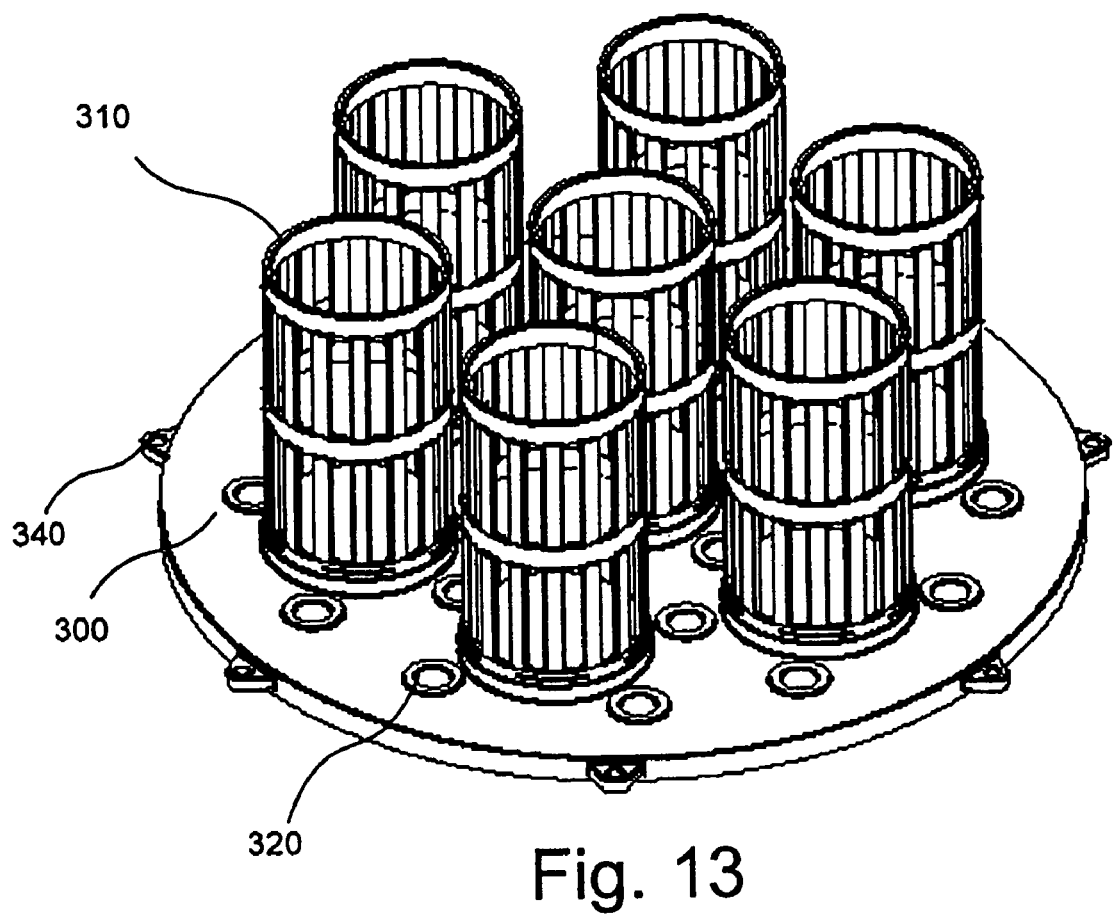
FIG. 13 shows a perspective view of a column tray assembly according to the invention, which can be used as a support tray for a structured packing and/or random packing.

FIG. 13 shows a perspective view of a column tray assembly according to the invention which can be used as a support tray for a structured packing and/or random packing. The column tray assembly substantially corresponds to the column tray assembly shown in FIGS. 5 and 6, and identical reference numerals denote the corresponding components. Lugs 340 for the transportation and the installation of the column tray assembly in the column are provided at the border of the tray 300.

Figure 14:
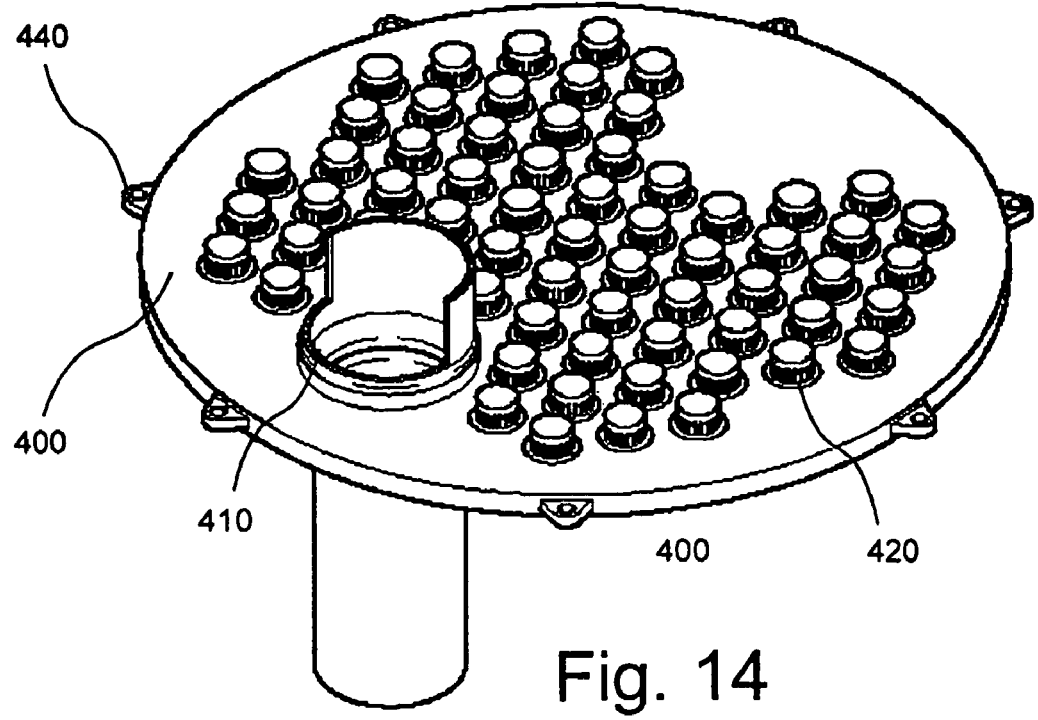
FIG. 14 shows a perspective view of a column tray assembly according to the invention, which can be used as a mass transfer tray.

FIG. 14 shows a perspective view of a column tray assembly according to the invention which can be used as a mass transfer tray. The column tray assembly substantially corresponds to the column tray assembly shown in FIGS. 7 and 8, and identical reference numerals denote the corresponding components. Lugs 440 for the transportation and the installation of the column tray assembly in the column are provided at the border of the tray 400.

As a result of the design, according to the invention, of the column tray assembly with hole diameters which can be chosen to be different and variations of the superstructures for mounting on the tray, comprising materials such as PTFE, PFA, PVDF, PE or glass, etc., the invention can be used in a very wide range of applications for operating columns, preferably of steel/enamel, steel/PTFE/PFA or glass or highly corrosion-resistant metals, such as tantalum and special alloys, also at a very high gas and liquid load, as may occur today with the use of high-performance random packings and structured packings.

The column tray assemblies according to the invention have the further advantage that, with a universally combinable corrosion-resistant base tray having suitable holes for receiving various superstructures and optionally smaller holes for the liquid outflow, into which holes distributor cups can be inserted, a very wide range of variants of corrosion-resistant column tray assemblies for very different intended applications can be produced merely by choosing the superstructures and inserts adapted to the respective intended use, for example, superstructures of the types shown in the present Application, and possibly by changing the middle bore and optionally also closing the small bores according to the modular principle. This considerably reduces the costs of production and maintenance. In particular, the operator can cut costs by virtue of the fact that he need stock only one base tray as a spare part for various column tray assemblies, such as support trays, liquid distributors, liquid redistributors, liquid collectors and mass transfer trays.

Thus, the present invention also relates to a tray for a column tray assembly, the area of the tray being greater than or equal to the cross-section of the column, the tray having passages for receiving suitable internals adapted to the respective intended use of the column tray assembly, and the tray being provided with a corrosion-resistant coating or a corrosion-resistant covering. Preferably, the tray is made flat and furthermore preferably enamelled or coated with a PTFE plastic.

It is furthermore within the scope of the present invention separately to provide and to market superstructures for the retrofitting of trays according to the invention or optionally of suitable conventional trays, or for the conversion of existing trays for another purpose, so that the invention also relates to the production, the provision and the marketing of individual superstructures adapted according to the invention, for example, of those made of plastic and glass, for the production of trays according to the invention by the end user.

What is claimed is:

1. A column tray assembly, comprising:
a tray provided with a plurality of passages; and
a plurality of superstructures mounted to said tray, each superstructure communicating with one of said passages; wherein:
said superstructures are provided with gas penetration holes having orifices oriented transverse to said tray;
the superstructures are formed of corrosion-resistant material;
the tray is flat and has a border provided with lugs suitable for assisting with installation of said tray in a column; and
the tray is formed from steel with at least one of a corrosion-resistant coating and a corrosion-resistant covering.

2. The column tray assembly according to claim 1, wherein said superstructures are removably mounted to said tray.

3. The column tray assembly according to claim 1, further comprising a structured packing supported by said superstructures.

4. The column tray assembly according to claim 1, further comprising
at least one grid supported by said superstructures; and
at least one or more of structured packing and random packing provided on said grid.

5. The colunm tray assembly according to claim 1, wherein said superstructures are embedded between one or more of structured packing and random packing.

6. The column tray assembly according to claim 1, wherein the orifices are slots provided on top portions of the superstructures.

7. The column tray assembly according to claim 1, wherein the tray is provided with a plurality of holes in addition to said passages.

8. The column tray assembly according to claim 7, wherein said plurality of holes each have a smaller diameter than a diameter of said passages.

9. The column tray assembly according to claim 8, further comprising distributor cups arranged in the holes.

10. The column tray assembly according to claim 9, further comprising distributor tubes connected to said distributor cups so as to provide for targeted liquid distribution over packing positioned below said tray.

11. The column tray assembly according claim 1, wherein the superstructures have sidewalls that are substantially perpendicular to the tray, and the gas penetration holes are formed in said sidewalls.

12. The column tray assembly according to claim 1, wherein the gas penetration holes comprise longitudinal slots formed in said superstructures.

13. The column tray assembly according to claim 12, wherein the longitudinal slots extend over substantially the total height of the superstructures.

14. The column tray assembly according to claim 12, wherein, when configured and used as any one or more of a liquid distributor, liquid redistributor and a liquid collector, the longitudinal slots extend from above a liquid level formed during such use, to an upper end region of the superstructures.

15. The column tray assembly according to claim 1, wherein the passages have a circular, polygonal, rectangular or square cross-section, and the sidewalls of the superstructures have a corresponding shape.

16. The column tray assembly according to claim 1, further comprising hoods provided on said superstructures.

17. The column tray assembly according to claim 1, wherein the at least one of a corrosion-resistant coating and a corrosion-resistant covering is one or more of the group consisting of: an enamel coating, corrosion-resistant plastic, tantalum and corrosion-resistant special alloys.

18. The column tray assembly according to claim 17, wherein the corrosion-resistant plastic comprises one from the group of: polytetrafluoroethylene (PTFE), perfluoroalkoxy polymers (PFA), polyvinylidene fluoride (PVDF), polyethylene (PE), and mixtures thereof.

19. The column tray assembly according to claim 1, wherein the superstructures are formed from one or more of the group consisting of: glass, corrosion-resistant plastic, tantalum and corrosion-resistant special alloys.

20. The column tray assembly according to claim 19, wherein the plastic comprises one from the group of: polytetrafluoroethylene (PTFE), perfluoroalkoxy polymers (PFA), polyvinylidene fluoride (PVDF), polyethylene (PE), and mixtures thereof.

21. The column tray assembly according to claim 1, wherein at least one of said superstructures extends below a plane of the tray and has a lower end configured as an outflow pipe.

22. The column tray assembly according to claim 1, in combination with a plurality of different superstructures, each of said different superstructures capable of being mounted to said tray.

23. The column tray assembly according to claim 1, selectively convertible into any of a support tray, a liquid distributor, a liquid redistributor, a liquid collector and a mass transfer tray, upon mounting one or more suitable appropriate superstructures to the tray.

24. The column tray assembly according to claim 1, wherein the superstructures are chimneys.

25. The column tray assembly according to claim 24 configured as a liquid collector, and further comprising at least one outflow pipe, and wherein said passages are the only openings formed in said tray through which gas or liquid pass during use.

26. The column tray assembly according to claim 24, wherein the tray further comprises a plurality of holes having a diameter smaller than the diameters of the passages.

27. The column tray assembly according to claim 26 configured as a liquid distributor or liquid redistributor, and further comprising distributor cups or overflow bushes, or both, installed in said plurality of holes.

28. The column tray assembly according to claim 26 configured as a liquid collector, wherein said plurality of holes are closed.

29. The column tray assembly according to claim 26, wherein the chimneys are provided with longitudinal slots substantially along their entire height.

30. The column tray assembly according to claim 29, further comprising distributor cups or overflow bushes, or both, installed in said plurality of holes, whereby the column tray is suitable for use both as a support tray and also as liquid distributor.

31. The column tray assembly according to claim 26 configured as a mass transfer tray, wherein:
at least one passage is provided with an outflow pipe;
the remaining passages are blocked; and
bubble-caps are installed in said plurality of holes.

32. A column comprising:
a colunm tray assembly comprising:
a tray provided with a plurality of passages; and
at least one superstructure removably mounted to said tray, said superstructure communicating with at least one of said plurality of passages; wherein:
said superstructure is provided with gas penetration holes having orifices oriented transverse to said tray;
the at least one superstructure is formed of corrosion-resistant material;
the tray is flat and has a border provided with lugs suitable for assisting with installation of said tray in said column; and
the tray is formed from steel with at least one of a corrosion-resistant coating and a corrosion-resistant covering.

33. The column according to claim 32, and lined with one or more of enamel, corrosion-resistant plastic, polytetrafluoroethylene (PTFE), perfluoroalkoxy polymers (PFA), polyvinylidene fluoride (PVDF), polyethylene (PE), or formed from one of more of glass, tantalum and special alloys.

34. The column according to claim 32, wherein an area of the tray is greater than or equal to a cross-sectional area of the column.

35. A collection of column components comprising:
at least one tray having passages formed therein;
at least two different superstructures, each superstructure configured and dimensioned to be removably mounted to said tray such that it communicates with one of said passages, wherein:

each superstructure is provided with gas penetration holes having orifices oriented transverse to said tray, when said each superstructure is mounted to said tray;
the tray is flat and has a border provided with a lugs suitable for assisting with installation of the tray in a column; and
the tray is formed from steel with at least one of a corrosion-resistant coating and a corrosion-resistant covering.

* * * * *